(12) United States Patent
Takahashi

(10) Patent No.: US 11,501,920 B2
(45) Date of Patent: Nov. 15, 2022

(54) MULTILAYER CERAMIC ELECTRONIC COMPONENT

(71) Applicant: Murata Manufacturing Co., Ltd., Nagaokakyo (JP)

(72) Inventor: Takefumi Takahashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/203,855

(22) Filed: Mar. 17, 2021

(65) Prior Publication Data

US 2021/0327645 A1 Oct. 21, 2021

(30) Foreign Application Priority Data

Mar. 27, 2020 (JP) .............................. JP2020-058233

(51) Int. Cl.
| | |
|---|---|
| *H01G 4/232* | (2006.01) |
| *H01G 4/12* | (2006.01) |
| *H01G 4/248* | (2006.01) |
| *H01G 4/30* | (2006.01) |

(52) U.S. Cl.
CPC .......... *H01G 4/232* (2013.01); *H01G 4/1209* (2013.01); *H01G 4/248* (2013.01); *H01G 4/30* (2013.01)

(58) Field of Classification Search
CPC ........ H01G 4/232; H01G 4/1208; H01G 4/30; H01G 4/248; H01G 4/1209
USPC .... 361/321.1, 301.4, 306.3, 309, 321.3, 303
See application file for complete search history.

(56) References Cited

U.S. PATENT DOCUMENTS

| | | | | |
|---|---|---|---|---|
| 9,202,640 | B2* | 12/2015 | Zenzai | H01G 4/252 |
| 2010/0039749 | A1* | 2/2010 | Ritter | H01G 4/30 |
| | | | | 29/25.42 |
| 2013/0208400 | A1* | 8/2013 | Ahn | H01G 4/232 |
| | | | | 361/303 |
| 2017/0018359 | A1* | 1/2017 | Kimura | H01G 4/2325 |
| 2017/0345569 | A1 | 11/2017 | Sakatsume et al. | |

FOREIGN PATENT DOCUMENTS

| | | |
|---|---|---|
| CN | 1755849 A | 4/2006 |
| CN | 107452503 A | 12/2017 |
| JP | 09-129476 A | 5/1997 |

(Continued)

OTHER PUBLICATIONS

Official Communication issued in corresponding Chinese Patent Application No. 202110310931.1, dated Jun. 13, 2022.

*Primary Examiner* — Arun Ramaswamy
(74) *Attorney, Agent, or Firm* — Keating & Bennett, LLP

(57) ABSTRACT

A multilayer ceramic electronic component includes a multilayer body, and an external electrode layer including a foundation electrode layer which is a fired layer. The multilayer body includes an inner layer portion including ceramic layers and inner conductive layers, and outer layer portions each including the ceramic layers. The foundation electrode layer includes an inner layer electrode portion adjacent to the inner layer portion and outer layer electrode portions respectively adjacent to the outer layer portions. The outer layer electrode portions respectively include high-content regions and low-content regions in order from an end surface of the multilayer body. The content of metal in the high-content regions is higher than the content of metal in the low-content regions.

19 Claims, 7 Drawing Sheets

(56) References Cited

FOREIGN PATENT DOCUMENTS

| | | | |
|---|---|---|---|
| JP | 2001-358032 | A | 12/2001 |
| JP | 2016-076582 | A | 5/2016 |
| JP | 2017-027987 | A | 2/2017 |

* cited by examiner

MULTILAYER CERAMIC ELECTRONIC COMPONENT

CROSS REFERENCE TO RELATED APPLICATIONS

This application claims the benefit of priority to Japanese Patent Application No. 2020-058233 filed on Mar. 27, 2020. The entire contents of this application are hereby incorporated herein by reference.

BACKGROUND OF THE INVENTION

1. Field of the Invention

The present invention relates to a multilayer ceramic electronic component.

2. Description of the Related Art

As a surface mount electronic component, a multilayer ceramic electronic component made using ceramic is known. For example, Japanese Unexamined Patent Application Publication No. 2016-76582 discloses a multilayer ceramic capacitor as such a multilayer ceramic electronic component. Such a multilayer ceramic capacitor includes a multilayer body in which a plurality of ceramic layers and a plurality of internal electrode layers are stacked, and external electrode layers each provided at the end of the multilayer body and connected to the plurality of internal electrode layers. The external electrode layer includes a foundation electrode layer and a plated layer covering the foundation electrode layer.

As a method of forming the foundation electrode layer, a method is known in which an end of a multilayer body is dipped in a paste electrode material including metal, such as Cu, and glass to apply the electrode material to the end of the multilayer body, and thereafter the electrode material is fired. As a result, the foundation electrode layer which is a fired layer is formed.

From the viewpoint of miniaturizing multilayer ceramic electronic components, such as a multilayer ceramic capacitor, a reduction in thickness of the external electrode layer has been investigated. Through a series of studies, experiments, and simulations, the inventors have acquired new knowledge in that, when the foundation electrode layer in the external electrode layer becomes thinner, the water resistance of multilayer ceramic electronic components decreases. This is considered to be due to the following reasons.

In a case in which the foundation electrode layer is formed using a dipping method or the like, when the end of the multilayer body is dipped in the electrode material, the thickness of the foundation electrode layer at the ridgeline portion of the end of the multilayer body becomes thinner than the thickness of the foundation electrode layer at the center portion of the end of the multilayer body, due to the surface tension of the paste electrode material.

In addition, when the foundation electrode layer is fired, a variation in grain growth of metal, such as Cu, occurs, so that a portion having a low metal content may occur.

It is considered that, when the thickness of the foundation electrode layer is reduced, a problem arises in that moisture infiltrates a portion having a low content of metal at the ridgeline portion or the like of the end of the multilayer body in the foundation electrode layer. For example, it is considered that, at the time of forming a plated layer, a plating solution infiltrates the multilayer body from the foundation electrode layer which is thin and has a low metal content at the ridgeline portion of the end of the multilayer body. Alternatively, when the foundation electrode layer of the ridgeline portion of the end of the multilayer body is thin, there are cases in which the plated layer is not formed at the ridgeline portion of the end of the multilayer body. In such a case, it is considered that, even after the plated layer is formed, a problem still arises in that moisture in the atmosphere infiltrates the multilayer body from the foundation electrode layer at the ridgeline portion of the end of the multilayer body in which the plated layer is not formed. It should be noted that, in the present application, moisture includes a plating solution, and water resistance includes resistance to a plating solution.

It is considered that, when the moisture thus infiltrated further infiltrates to the inner conductive layer in the multilayer body, the electrical characteristics of the multilayer ceramic electronic component are negatively impacted.

SUMMARY OF THE INVENTION

Preferred embodiments of the present invention provide multilayer ceramic electronic components each including an external electrode layer including a fired layer, such that each the multilayer ceramic electronic component reduces or prevents a decrease in water resistance of the external electrode layer even when the thickness of the external electrode layer is reduced.

A multilayer ceramic electronic component according to a preferred embodiment of the present invention includes a multilayer body including a plurality of ceramic layers and an inner conductive layer that are stacked, the multilayer body including a first main surface and a second main surface on opposite sides in a stacking direction, a first side surface and a second side surface on opposite sides in a width direction intersecting with the stacking direction, and a first end surface and a second end surface on opposite sides in a length direction intersecting with the stacking direction and the width direction; a first external electrode layer provided on the first end surface of the multilayer body and connected to the inner conductive layer; and a second external electrode layer provided on the second end surface of the multilayer body and connected to the inner conductive layer. The first external electrode layer includes a first foundation electrode layer defined by a fired layer including metal and glass, and a plated layer covering the first foundation electrode layer, and the second external electrode layer includes a second foundation electrode layer defined by a fired layer including metal and glass, and a plated layer covering the second foundation electrode layer. The multilayer body includes an inner layer portion including a portion of the plurality of ceramic layers and the inner conductive layer, and two outer layer portions sandwiching the inner layer portion and each including a portion other than the portion of the plurality of ceramic layers, the first foundation electrode layer includes a first inner layer electrode portion adjacent to the inner layer portion of the multilayer body, and two first outer layer electrode portions respectively adjacent to the two outer layer portions of the multilayer body, and the second foundation electrode layer includes a second inner layer electrode portion adjacent to the inner layer portion of the multilayer body, and two second outer layer electrode portions respectively adjacent to the two outer layer portions of the multilayer body. A maximum thickness of each of the first inner layer electrode portion, the two first outer layer electrode portions, the second inner layer electrode portion, and the two second outer layer electrode portions in the length direction is about 1 μm or more and about 35 μm or less, each of the two first outer layer electrode portions is thinner than the first inner layer electrode portion, and each of the two second outer layer electrode portions is thinner than the second inner layer electrode portion. Each of the two first outer layer electrode portions includes a first outer layer high-content region and a first outer layer low-content region in order from the first end surface of the multilayer body, and a content of metal in the first outer layer high-content region is higher than a content of metal in the first outer layer low-content region. Each of the two second outer layer electrode portions includes a second outer layer high-content region and a second outer layer low-content region in order from the second end surface of the multilayer body, and a content of metal in the second outer layer high-content region is higher than a content of metal in the second outer layer low-content region.

According to preferred embodiments of the present invention, in the multilayer ceramic electronic components each including an external electrode layer including a fired layer, it is possible to reduce or prevent a decrease in water resistance of the external electrode layer, even if the thickness of the external electrode layer is reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
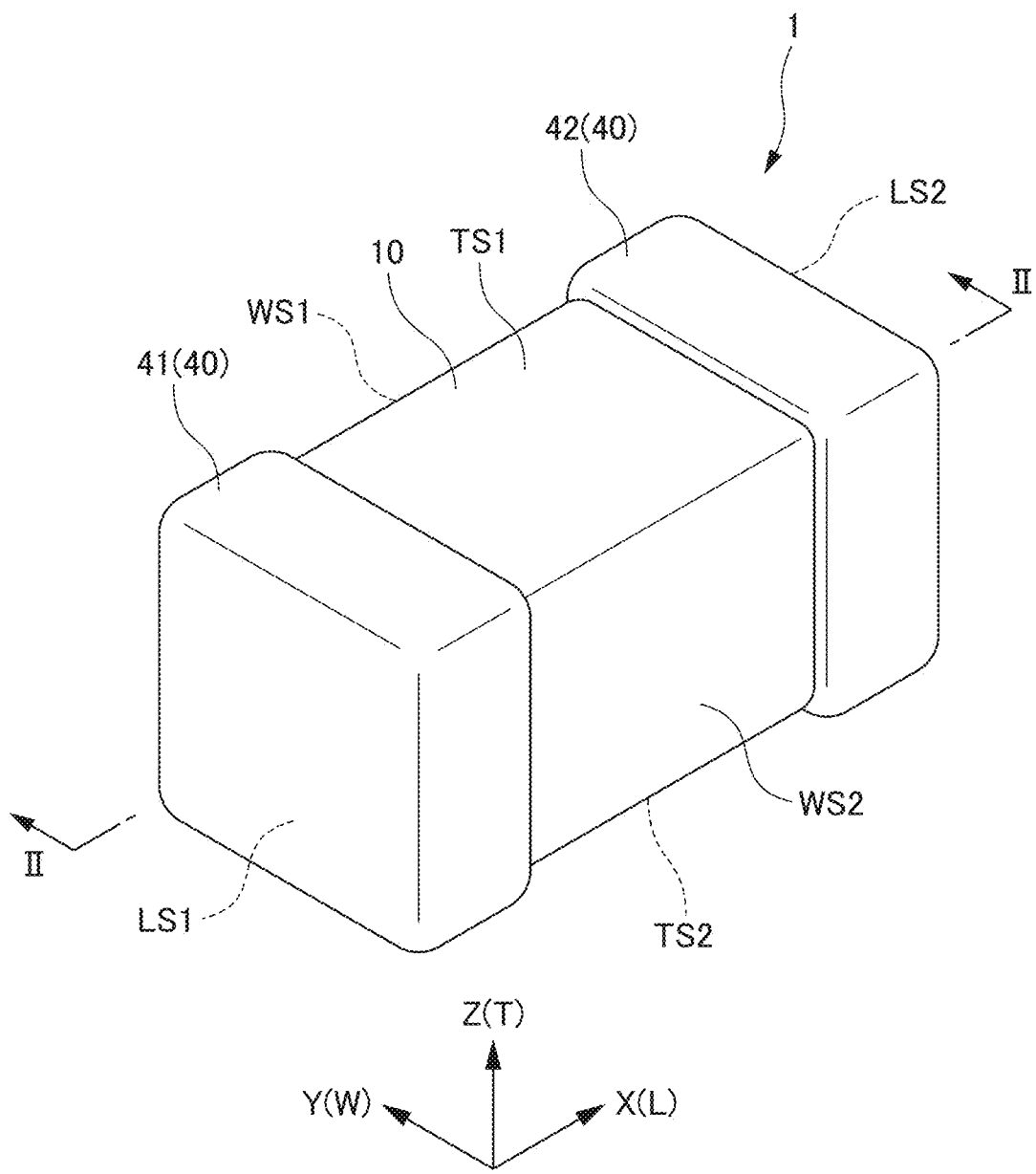
FIG. 1 is a perspective view showing a multilayer ceramic capacitor according to a preferred embodiment of the present invention.

Hereinafter, examples of preferred embodiments of the present invention will be described with reference to the accompanying drawings. It should be noted that the same reference numerals shall be used for the same or corresponding portions and elements in the drawings.

Figure 2:
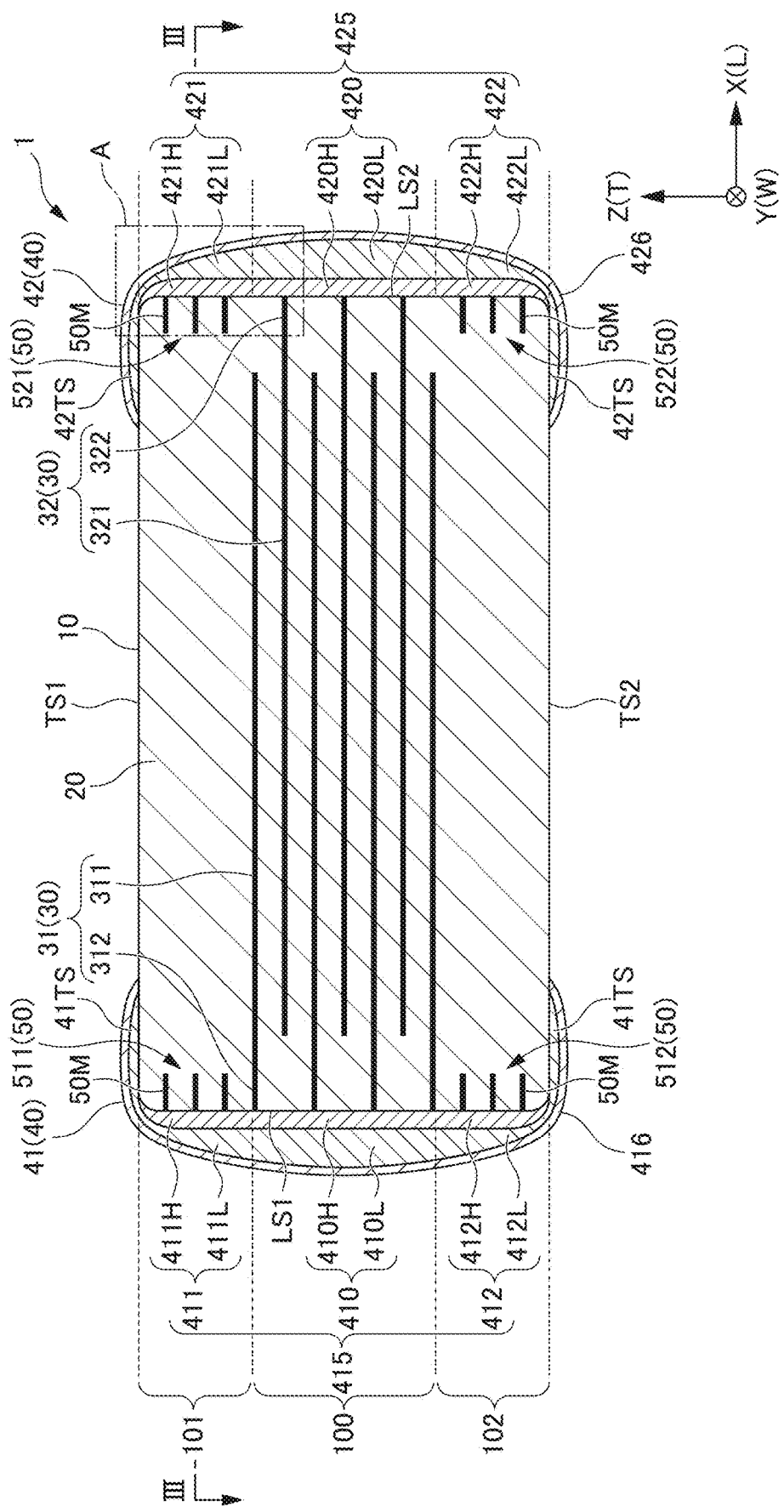
FIG. 2 is a cross-sectional view taken along line II-II of the multilayer ceramic capacitor shown in FIG. 1.
Figure 3:
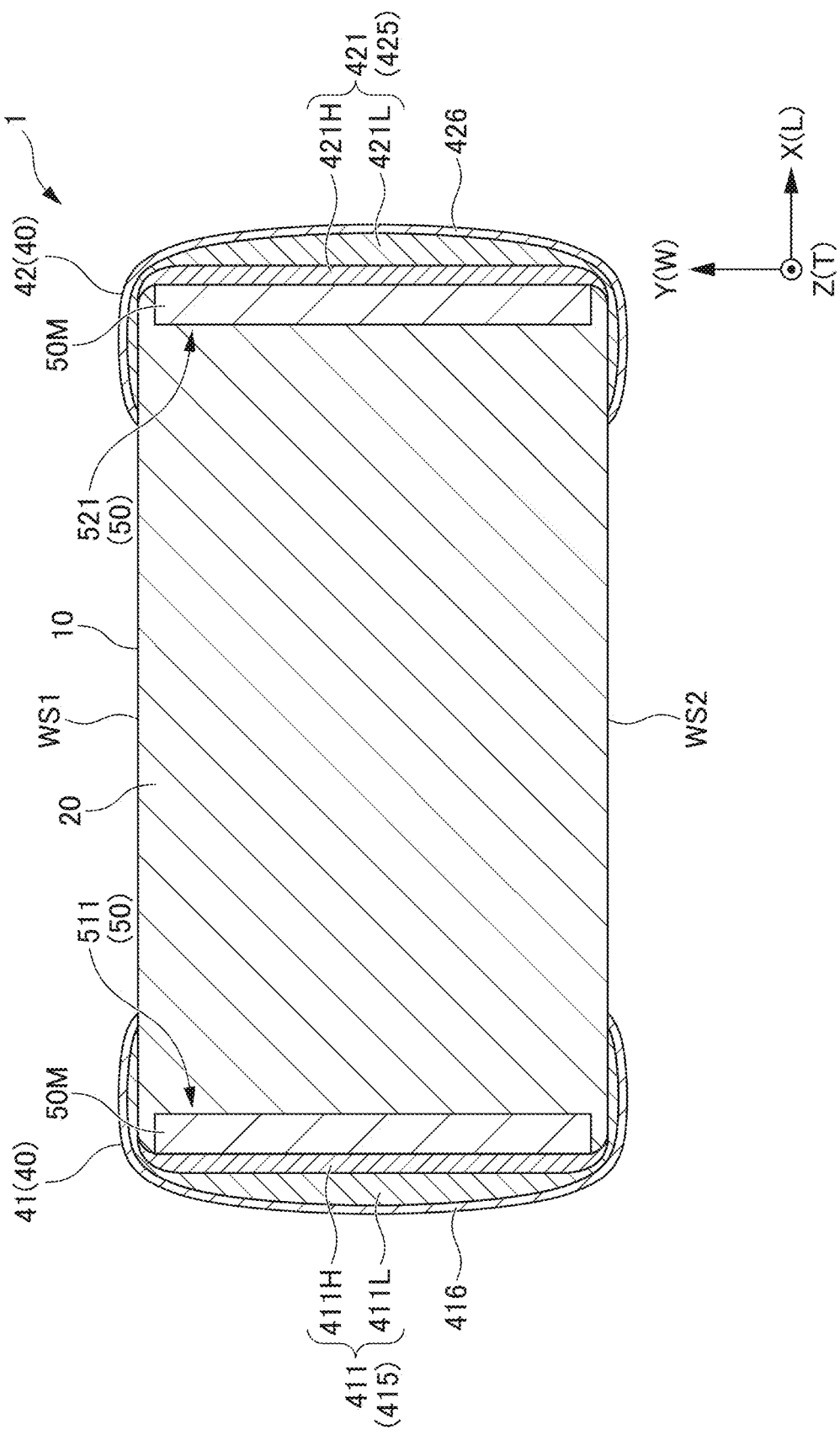
FIG. 3 is a cross-sectional view taken along line III-III of the multilayer ceramic capacitor shown in FIG. 2.

FIG. 1 is a perspective view showing a multilayer ceramic capacitor according to a preferred embodiment of the present invention, and FIG. 2 is a cross-sectional view taken along line II-II of the multilayer ceramic capacitor shown in FIG. 1. FIG. 3 is a cross-sectional view taken along line III-III of the multilayer ceramic capacitor shown in FIG. 2. The multilayer ceramic capacitor 1 shown in FIGS. 1 to 3 includes a multilayer body 10 and an external electrode layer 40. The multilayer ceramic capacitor is an example of a multilayer ceramic electronic component according to a preferred embodiment of the present invention.

In FIGS. 1 to 3, an XYZ orthogonal coordinate system is shown. The X direction refers to the length direction L of the multilayer ceramic capacitor 1 and the multilayer body 10, the Y direction refers to the width direction W of the multilayer ceramic capacitor 1 and the multilayer body 10, and the Z direction refers to the stacking direction T of the multilayer ceramic capacitor 1 and the multilayer body 10. In view of the above, the cross section shown in FIG. 2 is referred to as LT cross section.

It should be noted that the length direction L, the width direction W, and the stacking direction T are not necessarily in a relationship orthogonal or substantially orthogonal to one another, and may be in a relationship intersecting one another.

The multilayer body 10 has a rectangular or substantially rectangular shape, and includes a first main surface TS1 and a second main surface TS2 on opposite sides in the stacking direction T, a first side surface WS1 and a second side surface WS2 on opposite sides in the width direction W, and a first end surface LS1 and a second end surface LS2 on opposite sides in the length direction L.

The multilayer body 10 has rounded corners and ridgeline portions. The corners are portions where three surfaces of the multilayer body 10 intersect, and the ridgeline portions are portions where two surfaces of the multilayer body 10 intersect.

As shown in FIG. 2, the multilayer body 10 includes a plurality of dielectric layers 20, a plurality of internal electrode layers 30, and a plurality of metal diffusion base portions 50 stacked in the stacking direction T. Furthermore, the multilayer body 10 includes an inner layer portion 100, and a first outer layer portion 101 and a second outer layer portion 102 sandwiching the inner layer portion 100 in the stacking direction T. The dielectric layer 20 is an example of the ceramic layer, and the internal electrode layer 30 is an example of the inner conductive layer.

The inner layer portion 100 includes a portion of the plurality of dielectric layers 20 and the plurality of internal electrode layers 30. In the inner layer portion 100, the plurality of internal electrode layers 30 are disposed opposite to each other with the dielectric layer 20 interposed therebetween. The inner layer portion 100 generates a capacitance and defines and functions as a capacitor.

The first outer layer portion 101 is disposed close to the first main surface TS1 of the multilayer body 10, and the second outer layer portion 102 is disposed close to the second main surface TS2 of the multilayer body 10. More specifically, the first outer layer portion 101 is disposed between the first main surface TS1 and the internal electrode layer 30 closest to the first main surface TS1 among the plurality of internal electrode layers 30, and the second outer layer portion 102 is disposed between the second main surface TS2 and the internal electrode layer 30 closest to the second main surface TS2 among the plurality of internal electrode layers 30. Neither of the first outer layer portion 101 nor the second outer layer portion 102 includes any internal electrode layer 30, and each includes a portion of the plurality of dielectric layers 20 other than a portion of the plurality of dielectric layers 20 in the inner layer portion 100. The first outer layer portion 101 and the second outer layer portion 102 each define and function as a protective layer of the inner layer portion 100. Furthermore, the first outer layer portion 101 and the second outer layer portion 102 each include a plurality of metal diffusion base portions 50.

As the material of the dielectric layer 20, for example, a dielectric ceramic including $BaTiO_3$, $CaTiO_3$, $SrTiO_3$, $CaZrO_3$ or the like as a main component may preferably be used. Furthermore, as a material of the dielectric layer 20, for example, a Mn compound, Fe compound, Cr compound, Co compound, Ni compound or the like may be added as a sub-component.

The thickness of the dielectric layer 20 is not particularly limited and may preferably be, for example, about 0.2 µm or more and about 1.0 µm or less, and more preferably about 0.3 µm or more and about 0.5 µm or less. The number of the dielectric layers 20 is not particularly limited and may preferably be, for example, about 15 or more and about 700 or less. It should be noted that the number of the dielectric layers 20 is the total number of the number of dielectric layers of the inner layer portion and the number of dielectric layers of the outer layer portion.

The plurality of internal electrode layers 30 include a first internal electrode layer 31 and a second internal electrode layer 32. The first internal electrode layer 31 includes a counter electrode portion 311 and a lead-out electrode portion 312, and the second internal electrode layer 32 includes a counter electrode portion 321 and a lead-out electrode portion 322.

The counter electrode portion 311 and the counter electrode portion 321 are opposed to each other with the dielectric layer 20 interposed therebetween in the stacking direction T of the multilayer body 10. The shapes of the counter electrode portion 311 and the counter electrode portion 321 are not particularly limited and may preferably be, for example, rectangular or substantially rectangular. The counter electrode portion 311 and the counter electrode portion 321 each generate a capacitance and define and function as a capacitor.

The lead-out electrode portion 312 extends toward the first end surface LS1 of the multilayer body 10 from the counter electrode portion 311, and is exposed at the first end surface LS1. The lead-out electrode portion 322 extends toward the second end surface LS2 of the multilayer body 10 from the counter electrode portion 321, and is exposed at the second end surface LS2. The shapes of the lead-out electrode portion 312 and the lead-out electrode portion 322 are not particularly limited and may preferably be, for example, a rectangular or substantially rectangular shape or a racket shape which is the shape of an counter electrode to which the lead-out electrode having a narrower width than the counter electrode portion 311 is connected.

The first internal electrode layer 31 and the second internal electrode layer 32 each preferably include, for example, Ni as a main component. Furthermore, the first internal electrode layer 31 and the second internal electrode layer 32 may include, for example, at least one selected from metals such as Cu, Ag, Pd, or Au, or an alloy including at least one of these metals such as a Ag—Pd alloy, as the main component, or may include at least one of these as a component other than the main component. Furthermore, the first internal electrode layer 31 and the second internal electrode layer 32 may include dielectric particles having the same or substantially the same composition as that of the ceramic included in the dielectric layer 20 as a component other than the main component. It should be noted that, in the present disclosure, a metal which is the main component is defined as the metal component having the highest weight %.

The thickness of each of the first internal electrode layer 31 and the second internal electrode layer 32 is not particularly limited and may preferably be, for example, about 0.2 µm or more and about 2.0 µm or less. The number of the first internal electrode layer 31 and the second internal electrode layer 32 is not particularly limited and may preferably be, for example, about 15 or more and about 700 or less.

The metal diffusion base portion 50 includes first metal diffusion base portions 511 and 512 and second metal diffusion base portions 521 and 522.

The first metal diffusion base portion 511 is disposed at least at a portion close to the first end surface LS1 in the first outer layer portion 101 of the multilayer body 10, and the second metal diffusion base portion 521 is disposed at least at a portion close to the second end surface LS2 in the first outer layer portion 101 of the multilayer body 10. Furthermore, the first metal diffusion base portion 512 is disposed at least at a portion close to the first end surface LS1 in the second outer layer portion 102 of the multilayer body 10, and the second metal diffusion base portion 522 is disposed at least at a portion close to the second end surface LS2 in the second outer layer portion 102 of the multilayer body 10.

The first metal diffusion base portions 511 and 512 and the second metal diffusion base portions 521 and 522 each include a plurality of metal films 50M. The shape of the metal film 50M is not particularly limited and may preferably be, for example, a rectangular or substantially rectangular shape as shown in FIG. 3. The plurality of metal films 50M are stacked in the stacking direction T of the multilayer body 10 with the dielectric layer 20 interposed therebetween. The interval between the plurality of metal films 50M is not particularly limited, and may preferably be, for example, about 0.2 µm or more and about 1.0 µm or less, and more preferably about 0.3 µm or more and about 0.5 µm or less.

The thickness of the metal film 50M may be equal or substantially equal to the thickness of the internal electrode layer 30, or may be smaller than the thickness of the internal electrode layer 30.

The length of the metal film 50M in the first metal diffusion base portions 511 and 512 may be equal or substantially equal to the length of a first extension electrode portion 41TS in the first external electrode layer 41 described later, or may be shorter than the length of the first extension electrode portion 41TS. The length of the metal film 50M in the second metal diffusion base portions 521 and 522 may be equal or substantially equal to the length of a second extension electrode portion 42TS in the second external electrode layer 42 described later, or may be shorter than the length of the second extension electrode portion 42TS. The first extension electrode portion 41TS is a portion extending from the first end surface LS1 of the multilayer body 10 to portions of the first main surface TS1 and the second major surface TS2 in the first external electrode layer 41 to be described later, and the second extension electrode portion 42TS is a portion extending from the second end surface LS2 of the multilayer body 10 to portions of the first main surface TS1 and the second main surface TS2 in the second external electrode layer 42 to be described later. The length of the metal film 50M, the length of the first extension electrode portion 41TS, and the length of the second extension electrode portion 42TS are the lengths in the longitudinal direction L of the multilayer body 10.

Furthermore, the plurality of metal films 50M in the first metal diffusion base portions 511 and 512 connected to the first external electrode layer 41 may be disposed so as not to overlap with the second internal electrode layer 32 in the stacking direction T of the multilayer body 10. Furthermore, the plurality of metal films 50M in the second metal diffusion base portions 521 and 522 connected to the second external electrode layer 42 may be disposed so as not to overlap with the first internal electrode layer 31 in the stacking direction T of the multilayer body 10.

The metal film 50M preferably includes, for example, Ni as a main component. Furthermore, the metal film 50M may include, for example, at least one selected from metals such as Cu, Ag, Pd, or Au, or an alloy including at least one of these metals such as a Ag—Pd alloy, as a main component, or may include a component other than the main component. Furthermore, the metal film 50M may include dielectric particles having the same or substantially the same composition as that of the ceramic included in the dielectric layer 20, as a component other than the main component.

With such a configuration, during firing of the first external electrode layer 41 and the second external electrode layer 42, the first metal diffusion base portion 511 diffuses Ni in the first outer layer electrode portion 411 to be described later, the first metal diffusion base portion 512 diffuses Ni in the first outer layer electrode portion 412 to be described later, the second metal diffusion base portion 521 diffuses Ni in the second outer layer electrode portion 421, and the second metal diffusion base portion 522 diffuses Ni in the second outer layer electrode portion 422. As a result, a first outer layer high-content region 411H to be described later is formed in the first outer layer electrode portion 411, a first outer layer high-content region 412H to be described later is formed in the first outer layer electrode portion 412, a second outer layer high-content region 421H to be described later is formed in the second outer layer electrode portion 421, and a second outer layer high-content region 422H to be described later is formed in the second outer layer electrode portion 422. Furthermore, in the first metal diffusion base portions 511 and 512 and the second metal diffusion base portions 521 and 522, a portion of Ni is in a metal diffused state.

The dimension of the multilayer body 10 described above is not particularly limited and, for example, the length L1 in the length direction L is about 0.1 mm or more and about 10 mm or less, the width W1 in the width direction W is about 0.05 mm or more and about 10 mm or less, the thickness T1 in the stacking (lamination) direction T is about 0.05 mm or more and about 10 mm or less, preferably, for example, the length L1 in the length direction L is about 0.1 mm or more and about 1.2 mm or less, the width W1 in the width direction W is about 0.1 mm or more and about 0.7 mm or less, the thickness T1 in the stacking direction T is about 0.1 mm or more and about 0.7 mm or less, and more preferably, for example, the length L1 in the length direction L is about 0.2 mm or more and about 0.5 mm or less, the width W1 in the width direction W is about 0.1 mm or more and about 0.3 mm or less, and the thickness T1 in the stacking direction T is about 0.1 mm or more and about 0.3 mm or less. Furthermore, the thickness of each of the first outer layer portion 101 and the second outer layer portion 102 of the multilayer body 10 is not particularly limited, and may preferably be, for example, about 0.2 μm or more and about 40 μm or less, and more preferably about 0.5 μm or more and about 20 μm or less.

The external electrode layer 40 includes a first external electrode layer 41 and a second external electrode layer 42.

The first external electrode layer 41 is disposed on the first end surface LS1 of the multilayer body 10, and is connected to the first internal electrode layer 31. The first external electrode layer 41 may extend from the first end surface LS1 to a portion of the first main surface TS1 and a portion of the second main surface TS2. Furthermore, the first external electrode layer 41 may extend from the first end surface LS1 to a portion of the first side surface WS1 and a portion of the second side surface WS2. That is, the first external electrode layer 41 may include a first extension electrode portion 41TS extending from the first end surface LS1 to a portion of the first main surface TS1, a portion of the second main surface TS2, a portion of the first side surface WS1, and a portion of the second side surface WS2.

The second external electrode layer 42 is disposed on the second end surface LS2 of the multilayer body 10, and is connected to the second internal electrode layer 32. The second external electrode layer 42 may extend from the second end surface LS2 to a portion of the first main surface TS1 and a portion of the second main surface TS2. Furthermore, the second external electrode layer 42 may extend from the second end surface LS2 to a portion of the first side surface WS1 and a portion of the second side surface WS2. That is, the second external electrode layer 42 may include a second extension electrode portion 42TS extending from the second end surface LS2 to a portion of the first main surface TS1, a portion of the second main surface TS2, a portion of the first side surface WS1, and a portion of the second side surface WS2.

The first external electrode layer 41 includes a first foundation electrode layer 415 and a first plated layer 416, and the second external electrode layer 42 includes a second foundation electrode layer 425 and a second plated layer 426.

The first foundation electrode layer 415 and the second foundation electrode layer 425 are each a fired layer including metal and glass. Examples of the glass include a glass component including at least one selected from B, Si, Ba, Mg, Al, Li, or the like. As a specific example, borosilicate glass may be used. As the metal, for example, Cu is preferably included as a main component. Furthermore, the metal may include, for example, at least one selected from metals such as Ni, Ag, Pd, or Au, or an alloy such as a Ag—Pd alloy, as the main component or as a component other than the main component.

The fired layer is obtained by applying a conductive paste including metal and glass to the multilayer body by a dipping method, and firing. It should be noted that the firing may be performed after firing the internal electrode layer, or the firing may be performed simultaneously with the internal electrode layer. Furthermore, the fired layer may include a plurality of layers.

The first foundation electrode layer 415 includes a first inner layer electrode portion 410 adjacent to the inner layer portion 100 of the multilayer body 10, a first outer layer electrode portion 411 adjacent to the first outer layer portion 101 of the multilayer body 10, and a first outer layer electrode portion 412 adjacent to the second outer layer portion 102 of the multilayer body 10.

The second foundation electrode layer 425 includes a second inner layer electrode portion 420 adjacent to the inner layer portion 100 of the multilayer body 10, a second outer layer electrode portion 421 adjacent to the first outer layer portion 101 of the multilayer body 10, and a second outer layer electrode portion 422 adjacent to the second outer layer portion 102 of the multilayer body 10.

In the first foundation electrode layer 415 formed by the dipping method, the thickness of each of the first outer layer electrode portions 411 and 412 is smaller than the thickness of the first inner layer electrode portion 410. Furthermore, in the second foundation electrode layer 425 formed by the dipping method, the thickness of each of the second outer layer electrode portions 421 and 422 is smaller than the thickness of the second inner layer electrode portion 420. The thickness of the first inner layer electrode portion 410, the thickness of the first outer layer electrode portions 411 and 412, the thickness of the second inner layer electrode portion 420, and the thickness of each of the second outer layer electrode portions 421 and 422 are thicknesses in the longitudinal direction L of the multilayer body 10.

In the present preferred embodiment, by reducing the thickness, the maximum thickness of each of the first inner layer electrode portion 410 and the second inner layer electrode portion 420 is, for example, about 1 μm or more and about 40 μm or less, preferably about 3 μm or more and about 35 μm or less, and more preferably about 5 μm or more and about 25 μm or less.

The first outer layer electrode 411 includes the first outer layer high-content region 411H and a first outer layer low-content region 411L in order from the first end surface LS1 of the multilayer body 10. Furthermore, the first outer layer electrode portion 412 includes the first outer layer high-content region 412H and a first outer layer low-content region 412L in order from the first end surface LS1 of the multilayer body 10. Furthermore, the first inner layer electrode portion 410 includes a first inner layer high-content region 410H and a first inner layer low-content region 410L in order from the first end surface LS1 of the multilayer body 10.

The second outer layer electrode portion 421 includes the second outer layer high-content region 421H and a second outer layer low-content region 421L in order from the second end surface LS2 of the multilayer body 10. Furthermore, the second outer layer electrode portion 422 includes a second outer layer high-content region 422H and a second outer layer low-content region 422L in order from the second end surface LS2 of the multilayer body 10. Furthermore, the second inner layer electrode portion 420 includes a second inner layer high-content region 420H and a second inner layer low-content region 420L in order from the second end surface LS2 of the multilayer body 10.

The first outer layer high-content region 411H includes the same metal component Ni as the metal component Ni included in the metal film 50M in the first metal diffusion base portion 511, and the first outer layer low-content region 411L does not include the metal component Ni. This enables the content of the Ni in the first outer layer high-content region 411H to be higher than the content of the Ni in the first outer layer low-content region 411L. On the other hand, the content of the Cu in the first outer layer high-content region 411H is the same or substantially the same as the content of the Cu in the first outer layer low-content region 411L. As described above, the content of the metal in the first outer layer high-content region 411H is higher than the content of the metal in the first outer layer low-content region 411L by an amount corresponding to the higher content of the Ni. It should be noted that the content of glass in the first outer layer high-content region 411H is lower than the content of glass in the first outer layer low-content region 411L.

Similarly, the first outer layer high-content region 412H includes the same metal component Ni as the metal component Ni included in the metal film 50M in the first metal diffusion base portion 512, and the first outer layer low-content region 412L does not include the metal component Ni. This enables the content of the Ni in the first outer layer high-content region 412H to be higher than the content of the Ni in the first outer layer low-content region 412L. On the other hand, the content of the Cu in the first outer layer high-content region 412H is the same or substantially the same as the content of the Cu in the first outer layer low-content region 412L. As described above, the content of the metal in the first outer layer high content region 412H is higher than the content of the metal in the first outer layer low content region 412L by an amount corresponding to the higher content of the Ni. The content of glass in the first outer layer high content region 412H is lower than the content of glass in the first outer layer low content region 412L.

Similarly, the second outer layer high-content region 421H includes the same metal component Ni as the metal component Ni included in the metal film 50M in the second metal diffusion base portion 521, and the second outer layer low-content region 421L does not include the metal component Ni. This enables the content of the Ni in the second outer layer high-content region 421H to be higher than the content of the Ni in the second outer layer low-content region 421L. On the other hand, the content of the Cu in the second outer layer high-content region 421H is the same or substantially the same as the content of the Cu in the second outer layer low-content region 421L. As described above, the content of the metal in the second outer layer high content region 421H is higher than the content of the metal in the second outer layer low content region 421L by an amount corresponding to the higher content of the Ni. The content of glass in the second outer layer high content region 421H is lower than the content of glass in the second outer layer low content region 421L.

Similarly, the second outer layer high-content region 422H includes the same metal component Ni as the metal component Ni included in the metal film 50M in the second metal diffusion base portion 522, and the second outer layer low-content region 422L does not include the metal component Ni. As a result, the content of the Ni in the second outer layer high-content region 422H is higher than the content of the Ni in the second outer layer low-content region 422L. On the other hand, the content of the Cu in the second outer layer high-content region 422H is the same or substantially the same as the content of the Cu in the second outer layer low-content region 422L. As described above, the content of the metal in the second outer layer high content region 422H is higher than the content of the metal in the second outer layer low content region 422L by an amount corresponding to the higher content of the Ni. The content of glass in the second outer layer high content region 422H is lower than the content of glass in the second outer layer low content region 422L.

The first inner layer high-content region 410H includes the same metal component Ni as the metal component Ni included in the first internal electrode layer 31, and the first inner layer low-content region 410L does not include the metal component Ni. As a result, the content of the Ni in the first inner layer high content region 410H is higher than the content of the Ni in the first inner layer low content region 410L. On the other hand, the content of the Cu in the first inner layer high-content region 410H is the same or substantially the same as the content of the Cu in the first inner layer low-content region 410L. As described above, the content of the metal in the first inner layer high content region 410H is higher than the content of the metal in the first inner layer low content region 410L by an amount corresponding to the higher content of the Ni. The content of glass in the first inner layer high content region 410H is lower than the content of glass in the first inner layer low content region 410L.

The second inner layer high-content region 420H includes the same metal component Ni as the metal component Ni included in the second internal electrode layer 32, and the second inner layer low-content region 420L does not include the metal component Ni. As a result, the content of the Ni in the second inner layer high-content region 420H is higher than the content of the Ni in the second inner layer low-content region 420L. On the other hand, the content of the Cu in the second inner layer high-content region 420H is the same or substantially the same as the content of the Cu in the second inner layer low-content region 420L. As described above, the content of the metal in the second inner layer high-content region 420H is higher than the content of the metal in the second inner layer low-content region 420L by an amount corresponding to the higher content of the Ni. It should be noted that the content of glass in the second inner layer high-content region 420H is lower than the content of glass in the second inner layer low content region 420L.

The first outer layer high-content region 411H, the first inner layer high-content region 410H, and the first outer layer high-content region 412H are connected to each other. Similarly, the second outer layer high-content region 421H, the second inner layer high-content region 420H, and the second outer layer high-content region 422H are connected to each other.

The thickness of each of the first outer layer high-content region 411H, the first inner layer high-content region 410H, and the first outer layer high-content region 412H is not particularly limited and may preferably be, for example, about 0.5 µm or more and about 4 µm or less. Similarly, the thickness of each of the second outer layer high-content region 421H, the second inner layer high-content region 420H, and the second outer layer high-content region 422H is not particularly limited and may preferably be, for example, about 0.5 µm or more and about 4 µm or less.

The first outer layer high-content region 411H may be unevenly distributed in a portion of the first outer layer electrode portion 411 in the stacking direction T, for example, on the side of the first inner layer electrode portion 410. In this case, the first metal diffusion base portion 511, i.e., the metal film 50M, is unevenly distributed in a portion in the stacking direction T of the first outer layer portion 101 of the multilayer body 10, for example, on the side of the inner layer portion 100.

Similarly, the first outer layer high-content region 412H may be unevenly distributed in a portion of the first outer layer electrode portion 412 in the stacking direction T, for example, on the side of the first inner layer electrode portion 410. In this case, the first metal diffusion base portion 512, i.e., the metal film 50M, is unevenly distributed in a portion in the stacking direction T of the second outer layer portion 102 of the multilayer body 10, for example, on the side of the inner layer portion 100.

Similarly, the second outer layer high-content region 421H may be unevenly distributed in a portion of the second outer layer electrode portion 421 in the stacking direction T, for example, on the side of the second inner layer electrode portion 420. In this case, the second metal diffusion base portion 521, i.e., the metal film 50M, is unevenly distributed in a portion of the first outer layer portion 101 of the multilayer body 10 in the stacking direction T, for example, on the side of the inner layer portion 100.

Similarly, the second outer layer high-content region 422H may be unevenly distributed in a portion of the second outer layer electrode portion 422 in the stacking direction T, for example, on the side of the second inner layer electrode portion 420. In this case, the second metal diffusion base portion 522, i.e., the metal film 50M, is unevenly distributed in a portion of the second outer layer portion 102 of the multilayer body 10 in the stacking direction T, for example, on the side of the inner layer portion 100.

Alternatively, the first outer layer high-content region 411H may be disposed entirely in the stacking direction T over the first outer layer electrode portion 411. In this case, the first metal diffusion base portion 511, i.e., the metal film 50M, is disposed entirely in the stacking direction T of the first outer layer portion 101 of the multilayer body 10, for example, from a portion in contact with the boundary between the first outer layer portion 101 and the inner layer portion 100 to a portion in contact with the first main surface TS1. In other words, the first metal diffusion base portion 511, i.e., the metal film 50M, is disposed up to the ridgeline portion of the multilayer body 10.

Similarly, the first outer layer high-content region 412H may be disposed entirely in the stacking direction T of the first outer layer electrode portion 412. In this case, the first metal diffusion base portion 512, i.e., the metal film 50M, is disposed entirely in the stacking direction T of the second outer layer portion 102 of the multilayer body 10, for example, from a portion in contact with the boundary between the second outer layer portion 102 and the inner layer portion 100 to a portion in contact with the second main surface TS2. In other words, the first metal diffusion base portion 512, i.e., the metal film 50M, is disposed up to the ridgeline portion of the multilayer body 10.

Similarly, the second outer layer high-content region 421H may be disposed entirely in the stacking direction T of the second outer layer electrode portion 421. In this case, the second metal diffusion base portion 521, i.e., the metal film 50M, is disposed entirely in the stacking direction T of the first outer layer portion 101 of the multilayer body 10, for example, from a portion in contact with the boundary between the first outer layer portion 101 and the inner layer portion 100 to a portion in contact with the first main surface TS1. In other words, the second metal diffusion base portion 521, i.e., the metal film 50M, is disposed up to the ridgeline portion of the multilayer body 10.

Similarly, the second outer layer high-content region 422H may be disposed entirely in the stacking direction T of the second outer layer electrode portion 422. In this case, the second metal diffusion base portion 522, i.e. the metal film 50M, is disposed entirely in the stacking direction T of the second outer layer portion 102 of the multilayer body 10, for example, a portion in contact with the boundary between the second outer layer portion 102 and the inner layer portion 100, for example, from a portion in contact with the boundary between the second outer layer portion 102 and the inner layer portion 100 to a portion in contact with the second main surface TS2. In other words, the second metal diffusion base portion 522, i.e., the metal film 50M, is disposed up to the ridgeline portion of the multilayer body 10.

The first plated layer 416 covers at least a portion of the first foundation electrode layer 415, and the second plated layer 426 covers at least a portion of the second foundation electrode layer 425. The first plated layer 416 and the second plated layer 426 preferably include, for example, at least one selected from metals such as Cu, Ni, Ag, Pd or Au, or an alloy such as an Ag—Pd alloy.

Each of the first plated layer 416 and the second plated layer 426 may include a plurality of layers. Each of the first plated layer 416 and the second plated layer 426 is preferably a two-layer structure of Ni plating and Sn plating, for example. The Ni plated layer prevents the foundation electrode layer from being eroded by solder when mounting the ceramic electronic component, and the Sn plated layer improves the wettability of the solder when mounting the ceramic electronic component, thus enabling easy mounting.

The thickness per layer of each of the first plated layer 416 and the second plated layer 426 is not particularly limited, and may preferably be, for example, about 1 μm or more and about 10 μm or less.

The measurement of the content of the metal can be confirmed, for example, by an X-ray diffraction method (XRD) or a wavelength dispersive X-ray analysis method (WDX). When the content of the metal is measured by WDX, the cross-section of the multilayer ceramic capacitor of the measurement sample is exposed by polishing or the like. By analyzing the portion of the measurement target in the exposed cross section by WDX, the distribution state of elements as a measurement target is measured. Based on this measurement result, a mapping analysis result of the element as a measurement target is obtained. The content of the glass can be obtained by performing WDX mapping analysis on the elements of the glass in the same manner as described above.

The content of the metal is measured by measuring the area of the region occupied by the metal in the region divided by the unit area of the cross section. The content of the glass is measured by measuring the area of the region occupied by the glass in the region divided by the unit area of the cross section. For the unit area, a square area is used. The length of one side of the square may preferably be, for example, about 0.5 μm or more and about 4 μm or less.

Next, a non-limiting example of a method of manufacturing the multilayer ceramic capacitor 1 described above will be described. First, a dielectric sheet for the dielectric layer 20, a conductive paste for the internal electrode layer 30, and a conductive paste for the metal film 50M are prepared. The dielectric sheet and the conductive paste include a binder and a solvent. As the binder and the solvent, known materials can be used.

Next, the conductive paste is printed on the dielectric sheet in a predetermined pattern, for example, to form an internal electrode pattern on the dielectric sheet. Furthermore, the conductive paste is printed on the dielectric sheet in a predetermined pattern, for example, to thereby a metal film pattern on the dielectric sheet. As a method of forming the internal electrode pattern and the metal film pattern, screen printing, gravure printing, or the like, for example, can be used.

Next, a predetermined number of dielectric sheets for the second outer layer portion 102 on which the metal film pattern is printed and a predetermined number of dielectric sheets for the second outer layer portion 102 on which the internal electrode pattern or the metal film pattern is not printed are stacked. The dielectric sheet for the inner layer portion 100 on which the internal electrode pattern is printed is sequentially stacked on the top of each other. On the top of them, a predetermined number of dielectric sheets for the first outer layer portion 101 on which the metal film pattern is printed, and a predetermined number of the dielectric sheets for the first outer layer portion 101 on which the internal electrode pattern or the metal film pattern is not printed are stacked. Thus, a stacked (laminated) sheet is manufactured.

Next, using, for example, hydrostatic pressing, the stacked sheet is pressed in the stacking direction, to produce a laminated block. Next, the laminated block is cut to a predetermined size, and a laminated chip is cut out. At this time, the corners and ridgeline portions of the laminated chip are rounded by barrel polishing or the like. Next, the laminated chip is fired to produce the multilayer body 10. The firing temperature is preferably about 900° C. or more and about 1400° C. or less, for example, depending on the materials of the dielectric and the internal electrode.

Next, the first end surface LS1 of the multilayer body 10 is dipped in the conductive paste which is an electrode material for the foundation electrode layer by using a dipping method, to apply the conductive paste for the foundation electrode layer 415 to the first end surface LS1. Similarly, the second end surface LS2 of the multilayer body 10 is dipped in the conductive paste which is an electrode material for the foundation electrode layer by using the dipping method, to apply the conductive paste for the second foundation electrode layer 425 to the second end surface LS2. Thereafter, these conductive pastes are fired to form the first foundation electrode layer 415 and the second foundation electrode layer 425 which are fired layers. The firing temperature is preferably about 600° C. or higher and about 900° C. or less, for example.

Thereafter, the first plated layer 416 is formed on the surface of the first foundation electrode layer 415 to form the first external electrode layer 41, and the second plated layer 426 is formed on the surface of the second foundation electrode layer 425 to form the second external electrode layer 42. Through the above steps, the multilayer ceramic capacitor 1 described above is obtained.

Here, the inventors of preferred embodiments of the present invention have studied reducing the thickness of the first external electrode layer 41 and the second external electrode layer 42, particularly the first foundation electrode layer 415 and the second foundation electrode layer 425, from the viewpoint of miniaturization of the multilayer ceramic capacitor 1. For example, as described above, the maximum thickness of the first foundation electrode layer 415 and the second foundation electrode layer 425 is, for example, about 1 μm or more and about 40 μm or less, preferably about 3 μm or more and about 35 μm or less, and more preferably about 5 μm or more and about 25 μm or less. However, the inventors of preferred embodiments of the present invention have discovered that, when the thickness of each of the first foundation electrode layer 415 and the second foundation electrode layer 425 is reduced, the water resistance of the multilayer ceramic capacitor is reduced. This is considered to be due to the following reasons.

In a case in which the first foundation electrode layer 415 and the second foundation electrode layer 425 are formed by using the dipping method, when the first end surface LS1 and the second end surface LS2 of the multilayer body 10 are dipped in the electrode material, the first foundation electrode layer 415 at the ridgeline portion on the first end surface LS1 of the multilayer body 10 becomes thinner than the first foundation electrode layer 415 at the center portion of the first end surface LS1 of the multilayer body 10 due to the surface tension of the paste electrode material. The first foundation electrode layer 415 in the ridgeline portion of the second end surface LS2 of the multilayer body 10 becomes thinner than the first foundation electrode layer 415 at the central portion of the second end surface LS2 of the multilayer body 10. In other words, as described above, in the first foundation electrode layer 415, the thickness of each of the first outer layer electrode portions 411 and 412 is smaller than the thickness of the first inner layer electrode portion 410. Furthermore, in the second foundation electrode layer 425, the thickness of each of the second outer layer electrode portions 421 and 422 is smaller than the thickness of the second inner layer electrode portion 420.

In addition, in a case in which the first foundation electrode layer 415 and the second foundation electrode layer 425 are formed by the dipping method using a paste electrode material of metal such as Cu and glass, variations in grain growth of metal such as Cu occur during firing, so that a portion having a low metal content may occur.

Therefore, it is considered that, when the first foundation electrode layer 415 becomes thinner, water infiltrates a portion having a low metal content in the ridgeline portion of the first end surface LS1 of the multilayer body 10 in the first foundation electrode layer 415, i.e. in the first outer layer electrode portions 411 and 412 of the first foundation electrode layer 415. In addition, it is considered that, when the second foundation electrode layer 425 becomes thinner, water infiltrates a portion having a low metal content in the ridgeline portion of the second end surface LS2 of the multilayer body 10 in the second foundation electrode layer 425, i.e. in the second outer layer electrode portions 421 and 422 of the second foundation electrode layer 425.

For example, it is considered that, during the formation of the plated layer, the plating solution infiltrates the multilayer body 10 from the ridgeline portion of the first end surface LS1 of the multilayer body 10, i.e. the first foundation electrode layer 415 which is thin and has a low metal content in the first outer layer electrode portions 411 and 412. Furthermore, it is considered that the plating solution infiltrates the multilayer body 10 from the end of the first extension electrode portion 41TS in the first foundation electrode layer 415. Similarly, it is considered that, during the formation of the plated layer, the plating solution infiltrates the multilayer body 10 from the ridgeline portion of the second end surface LS2 of the multilayer body 10, i.e. from the second foundation electrode layer 425 which is thin and has a low metal content in the second outer layer electrode portions 421 and 422. Furthermore, it is considered that the plating solution infiltrates the multilayer body 10 from the end of the second extension electrode portion 42TS in the second foundation electrode layer 425. It should be noted that, in the present application, moisture includes a plating solution, and water resistance includes resistance to the plating solution.

Alternatively, in a case in which the ridgeline portion of the first end surface LS1 of the multilayer body 10, i.e., the first foundation electrode layer 415 in the first outer layer electrode portions 411 and 412, is thin, there may be a case in which the first plated layer 416 is not formed on the ridgeline portion on the first end surface LS1 of the multilayer body 10, i.e., the first outer layer electrode portions 411 and 412. In this case, it is considered that, even after the formation of the plated layer, moisture in the atmosphere infiltrates the multilayer body 10 from the ridgeline portion of the first end surface LS1 of the multilayer body 10 on which the first plated layer 416 is not formed, that is, from the first foundation electrode layer 415 in the first outer layer electrode portions 411 and 412. Similarly, in a case in which the ridgeline portion of the second end surface LS2 of the multilayer body 10, i.e., the second foundation electrode layer 425 in the second outer layer electrode portions 421 and 422, is thin, there may be a case in which the second plated layer 426 is not formed on the ridgeline portion of the second end surface LS2 of the multilayer body 10, i.e., the second outer layer electrode portions 421 and 422. In this case, it is considered that, even after the formation of the plated layer, moisture in the atmosphere may infiltrate the multilayer body 10 from the ridgeline portion of the second end surface LS2 of the multilayer body 10 on which the second plated layer 426 is not formed, that is, from the second foundation electrode layer 425 in the second outer layer electrode portions 421 and 422.

It is considered that, when the moisture further infiltrates the inner layer portion 100 of the multilayer body 10, i.e., when infiltrating the inner conductive layer, the electrical characteristics of the capacitor is lowered.

In this regard, in the present preferred embodiment, when firing the first foundation electrode layer 415 and the second foundation electrode layer 425, solid phase interdiffusion occurs between the Ni of the metal film 50M in the first metal diffusion base portion 511 and the Cu of the first outer layer high-content region 411H, a result of which a Ni—Cu alloy is formed in the first outer layer high-content region 411H, and a strong bond is ensured therebetween. Similarly, solid phase interdiffusion occurs between the Ni of the metal film 50M in the first metal diffusion base portion 512 and the Cu of the first outer layer high-content region 412H, such that a Ni—Cu alloy is formed in the first outer layer high-content region 412H, and a strong bond is ensured therebetween.

Similarly, solid phase interdiffusion occurs between the Ni of the metal film 50M in the second metal diffusion base portion 521 and the Cu of the second outer layer high-content region 421H, such that a Ni—Cu alloy is formed in the second outer layer high-content region 421H, and a strong bond is ensured therebetween. Similarly, solid phase interdiffusion occurs between the Ni of the metal film 50M in the second metal diffusion base portion 522 and the Cu of the second outer layer high-content region 422H, such that a Ni—Cu alloy is formed in the second outer layer high-content region 422H, and a strong bond is ensured therebetween.

More specifically, the foundation electrode layer includes glass frit to improve the bonding property between the foundation electrode layer and the multilayer body, which prevents the plating solution from infiltrating, and the like. As the glass frit, conventionally, a boric acid-based glass, a borosilicate-based glass, or an aluminic acid-based glass, for example, is often used. Zinc oxide, alkaline earth metal oxide, and the like, for example, are used as a modifying element for the glass frit. When the foundation electrode layer is fired, the glass softens and flows to the interface of the foundation electrode layer/metal film. Ni of the metal film is dissolved and diffused into the glass which has become a liquid phase, further precipitates on the external electrode layer Cu, and diffuses to the inside.

For the same reason, when firing the first foundation electrode layer 415 and the second foundation electrode layer 425, solid-phase interdiffusion occurs between the Ni of the first internal electrode layer 31 and the Cu of the first inner layer high-content region 410H, such that a Ni—Cu alloy is formed in the first inner layer high-content region 410H, and a strong bond is ensured therebetween. Similarly, solid phase interdiffusion occurs between the Ni of the second internal electrode layer 32 and the Cu of the second inner layer high-content region 420H, such that a Ni—Cu alloy is formed in the second inner layer high-content region 420H, and a strong bond is ensured therebetween.

Figure 4:
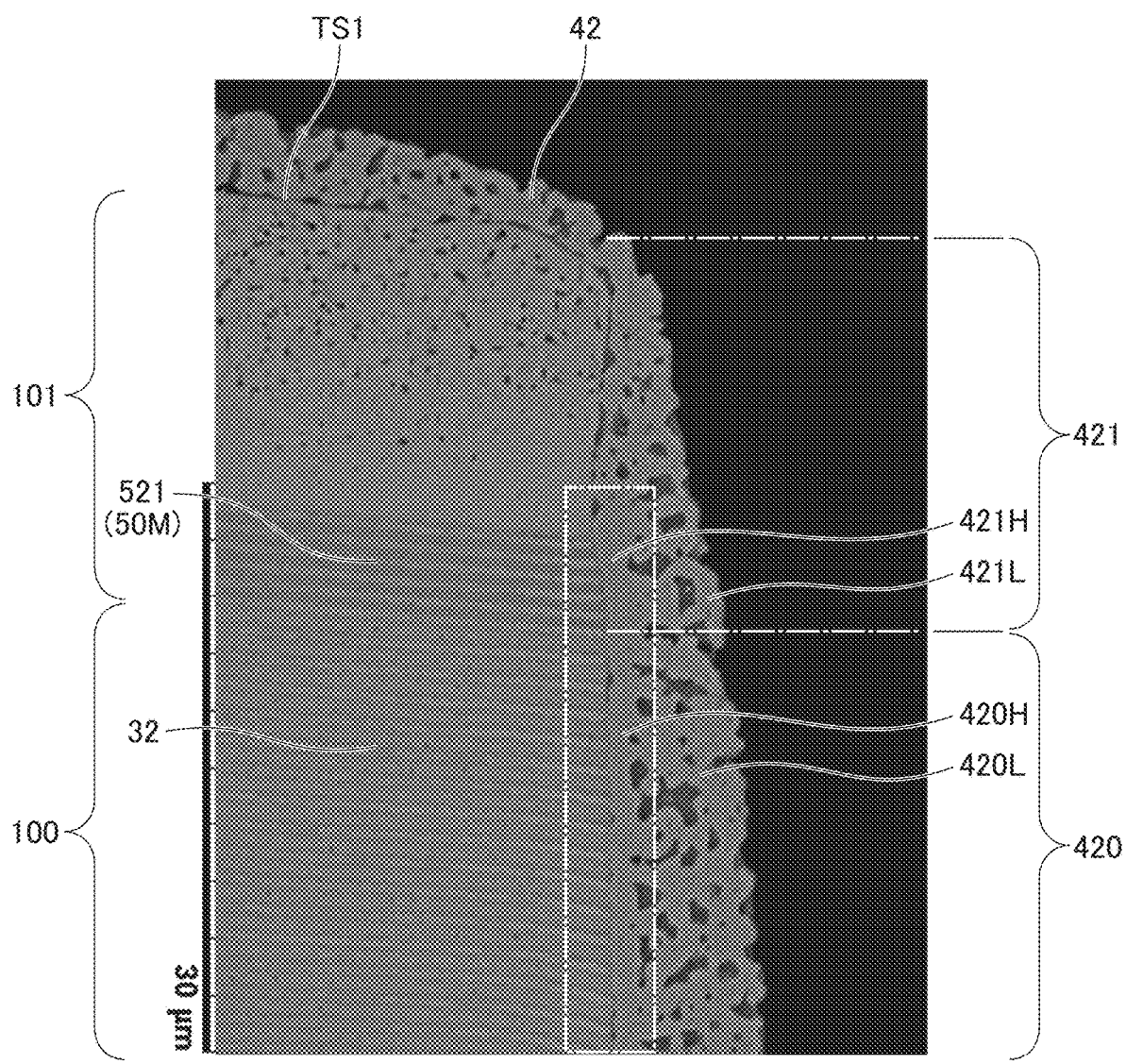
FIG. 4 is an enlarged cross-sectional view corresponding to a portion A in the cross section of the multilayer ceramic capacitor shown in FIG. 2, an enlarged cross-sectional view after firing a foundation electrode layer of an external electrode layer and before the formation of a plated layer, and an example of an actual observation.
Figure 5:
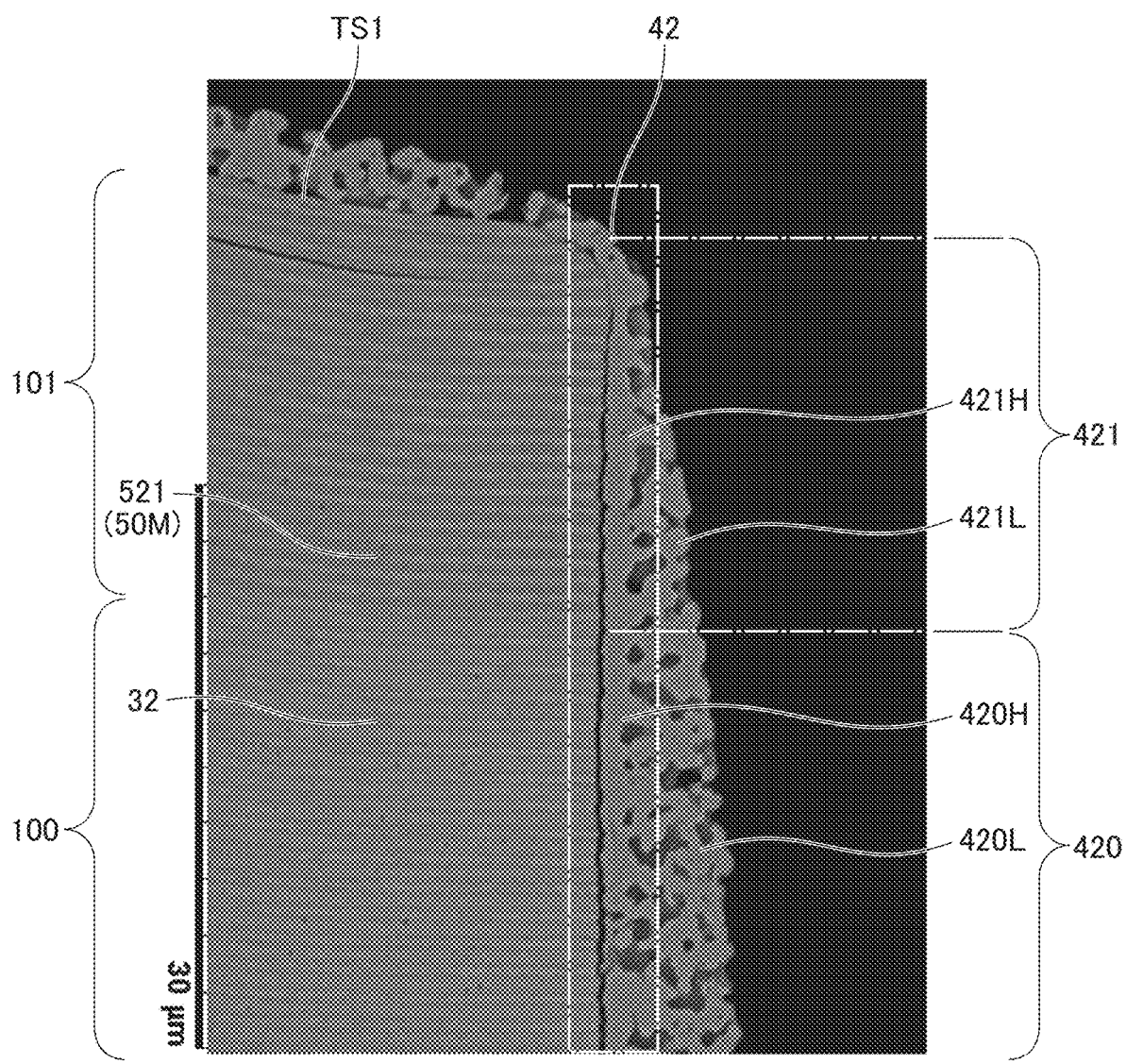
FIG. 5 is an enlarged cross-sectional view corresponding to a portion A in the cross section of the multilayer ceramic capacitor shown in FIG. 2, an enlarged cross-sectional view after firing a foundation electrode layer of an external electrode layer and before the formation of a plated layer, and another example of an actual observation.

As a result, as shown in FIGS. 4 and 5, when firing the first foundation electrode layer 415 and the second foundation electrode layer 425, the content of metal increases in the first outer layer high-content regions 411H and 412H and the second outer layer high-content regions 421H and 422H. In addition, the content of metal becomes high in the first inner layer high-content region 410H and the second inner layer high-content region 420H.

FIG. 4 corresponds to an enlarged cross-sectional view of a portion A in a cross section of the multilayer ceramic capacitor shown in FIG. 2, which is an enlarged cross-sectional view after firing the foundation electrode layer of the external electrode layer before the formation of the plated layer, and an example of an actual observation. FIG. 5 corresponds to an enlarged cross-sectional view of a portion A in a cross section of the multilayer ceramic capacitor shown in FIG. 2, which is an enlarged cross-sectional view after firing the foundation electrode layer of the external electrode layer before the formation of the plated layer, and another example of an actual observation. In FIG. 4, the second metal diffusion base portion 521, that is, the metal film 50M, is unevenly distributed on the side of the inner layer portion 100 of the first outer layer portion 101, and the second outer layer high-content region 421H is unevenly distributed on the side of the second inner layer electrode portion 420 of the second outer layer electrode portion 421. In FIG. 5, the second metal diffusion base portion 521, that is, the metal film 50M, is disposed entirely in the stacking direction T of the first outer layer portion 101, and the second outer layer high-content region 421H is disposed entirely in the stacking direction T of the second outer layer electrode portion 421.

As described above, according to the multilayer ceramic capacitor 1 of the present preferred embodiment, the content of metal in the first outer layer high-content regions 411H and 412H of the first foundation electrode layer 415 of the first external electrode layer 41 is relatively high, and the content of metal in the second outer layer high-content regions 421H and 422H of the second foundation electrode layer 425 of the second external electrode layer 42 is relatively high. As a result, even if the first foundation electrode layer 415 in the first external electrode layer 41 becomes thinner, it is possible to reduce or prevent moisture from infiltrating the first outer layer electrode portions 411 and 412 which are relatively thin. In addition, even if the second foundation electrode layer 425 in the second external electrode layer 42 becomes thinner, it is possible to reduce or prevent moisture from infiltrating the second outer layer electrode portions 421 and 422, which are relatively thin. Therefore, in the multilayer ceramic capacitor 1 including the external electrode layer including the foundation electrode layer which is a firing layer, even if the thickness of the foundation electrode layer in the external electrode layer is reduced, it is still possible to reduce or prevent a decrease in water resistance of the foundation electrode layer of the external electrode layer. As a result, it is possible to reduce or prevent the electrical characteristics of the capacitor from being lowered.

Furthermore, according to the multilayer ceramic capacitor 1 of the present preferred embodiment, the content of metal in the first inner layer high-content region 410H of the first foundation electrode layer 415 of the first external electrode layer 41 is relatively high, and the content of metal in the second inner layer high-content region 420H of the second foundation electrode layer 425 of the second external electrode layer 42 is relatively high. Furthermore, the first outer layer high-content region 411H, the first inner layer high-content region 410H, and the first outer layer high-content region 412H are connected in the first foundation electrode layer 415 of the first external electrode layer 41, and the second outer layer high-content region 421H, the second inner layer high-content region 420H, and the second outer layer high-content region 422H are connected in the second foundation electrode layer 425 of the second external electrode layer 42. With such a configuration, it is possible to further reduce or prevent moisture from infiltrating the inner layer portion 100 of the multilayer body 10, i.e., the inner conductive layer.

In the multilayer ceramic capacitor 1 of the present preferred embodiment, the first outer layer high-content regions 411H and 412H may be unevenly distributed in at least a portion on the side of the first inner layer electrode portion 410 in the stacking direction T, and the second outer layer high-content regions 421H and 422H may be unevenly distributed in at least a portion on the side of the second inner layer electrode portion 420 in the stacking direction T. With such a configuration, it is possible to reduce or prevent moisture from infiltrating the inner layer portion 100 of the multilayer body 10, i.e., the inner conductive layer.

Furthermore, in the multilayer ceramic capacitor 1 of the present preferred embodiment, the first outer layer high-content region 411H may be disposed entirely in the stacking direction T of the first outer layer electrode portion 411, that is, from a portion in contact with the boundary between the first outer layer portion 101 and the inner layer portion 100 to a portion in contact with the first main surface TS1. Similarly, the first outer layer high-content region 412H may be disposed entirely in the stacking direction T of the first outer layer electrode portion 412, that is, from a portion in contact with the boundary between the second outer layer portion 102 and the inner layer portion 100 to a portion in contact with the second main surface TS2. Similarly, the second outer layer high-content region 421H may be disposed entirely in the stacking direction T of the second outer layer electrode portion 421, i.e., from a portion in contact with the boundary between the first outer layer portion 101 and the inner layer portion 100 to a portion in contact with the first main surface TS1. Similarly, the second outer layer high-content region 422H may be disposed entirely in the stacking direction T of the second outer layer electrode portion 422, that is, from a portion in contact with the boundary between the second outer layer portion 102 and the inner layer portion 100 to a portion in contact with the second main surface TS2. With such a configuration, it is possible to prevent or further suppress moisture from infiltrating the inner layer portion 100 of the multilayer body 10, i.e., the inner conductive layer.

Furthermore, in the multilayer ceramic capacitor 1 of the present preferred embodiment, the interval between the plurality of metal films 50M in the stacking direction T in the first metal diffusion base portions 511 and 512 and the second metal diffusion base portions 521 and 522 may preferably be, for example, about 0.2 µm or more and about 1.0 µm or less, and more preferably about 0.3 µm or more and about 0.5 µm or less. As a result, the first outer layer high-content region 411H continuous in the stacking direction T, the first outer layer high-content region 412H continuous in the stacking direction T, the second outer layer high-content region 421H continuous in the stacking direction T, and the second outer layer high-content region 422H continuous in the stacking direction T are obtained. With such a configuration, it is possible to reduce or prevent moisture from infiltrating the inner layer portion 100 of the multilayer body 10, i.e., the inner conductive layer.

Furthermore, in the multilayer ceramic capacitor 1 of the present preferred embodiment, the length of the metal film 50M may be equal or substantially equal to the length of the first extension electrode portion 41TS in the first foundation electrode layer 415 of the first external electrode layer 41 and the length of the second extension electrode portion 42TS in the second foundation electrode layer 425 of the second external electrode layer 42, or may be shorter than the length of the first extension electrode portion 41TS and the length of the second extension electrode portion 42TS. Since the metal film 50M only needs to be able to diffuse metal into the first foundation electrode layer 415 of the first external electrode layer 41 and the second foundation electrode layer 425 of the second external electrode layer 42 in order to form a layer having a high content of metal, the length of the metal film 50M may be shortened in this manner.

Furthermore, in the multilayer ceramic capacitor 1 of the present preferred embodiment, the plurality of metal films 50M in the first metal diffusion base portions 511 and 512 connected to the first foundation electrode layer 415 of the first external electrode layer 41 may be disposed so as not to overlap with the second internal electrode layer 32 in the stacking direction T of the multilayer body 10. Furthermore, the plurality of metal films 50M in the second metal diffusion base portions 521 and 522 connected to the second foundation electrode layer 425 of the second external electrode layer 42 may be disposed so as not to overlap with the first internal electrode layer 31 in the stacking direction T of the multilayer body 10. With such a configuration, it is possible to reduce the stray capacitance in the first internal electrode layer 31 and the second internal electrode layer 32 caused by the metal film 50M, and it is possible to reduce or prevent a decrease in the designability of the capacitance of the capacitor.

Furthermore, in the multilayer ceramic capacitor 1 of the present preferred embodiment, the thickness of the metal film 50M may be equal or substantially equal to the thickness of the internal electrode layer 30, or may be thinner than the internal electrode layer 30. As described above, since the metal film 50M only needs to be able to diffuse metal into the first foundation electrode layer 415 of the first external electrode layer 41 and the second foundation electrode layer 425 of the second external electrode layer 42 in order to form a layer having a high content of metal, the thickness of the metal film 50M may be small in this manner. It is thus possible to reduce or prevent an increase in material cost of the metal film 50M.

Figure 6:
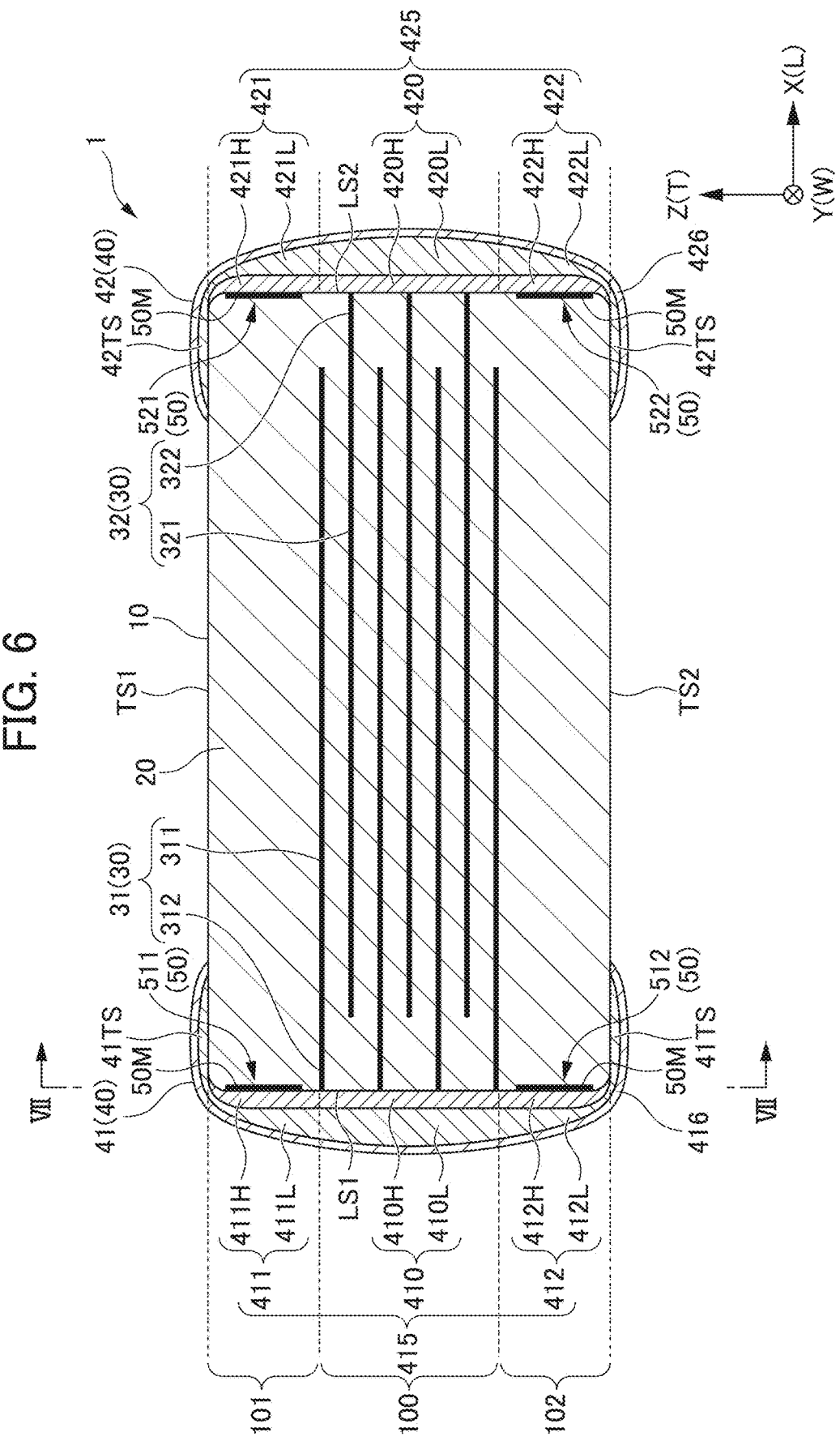
FIG. 6 is a cross-sectional view of a multilayer ceramic capacitor according to a modified example of a preferred embodiment, and is a cross-sectional view corresponding to line II-II in FIG. 1.
Figure 7:
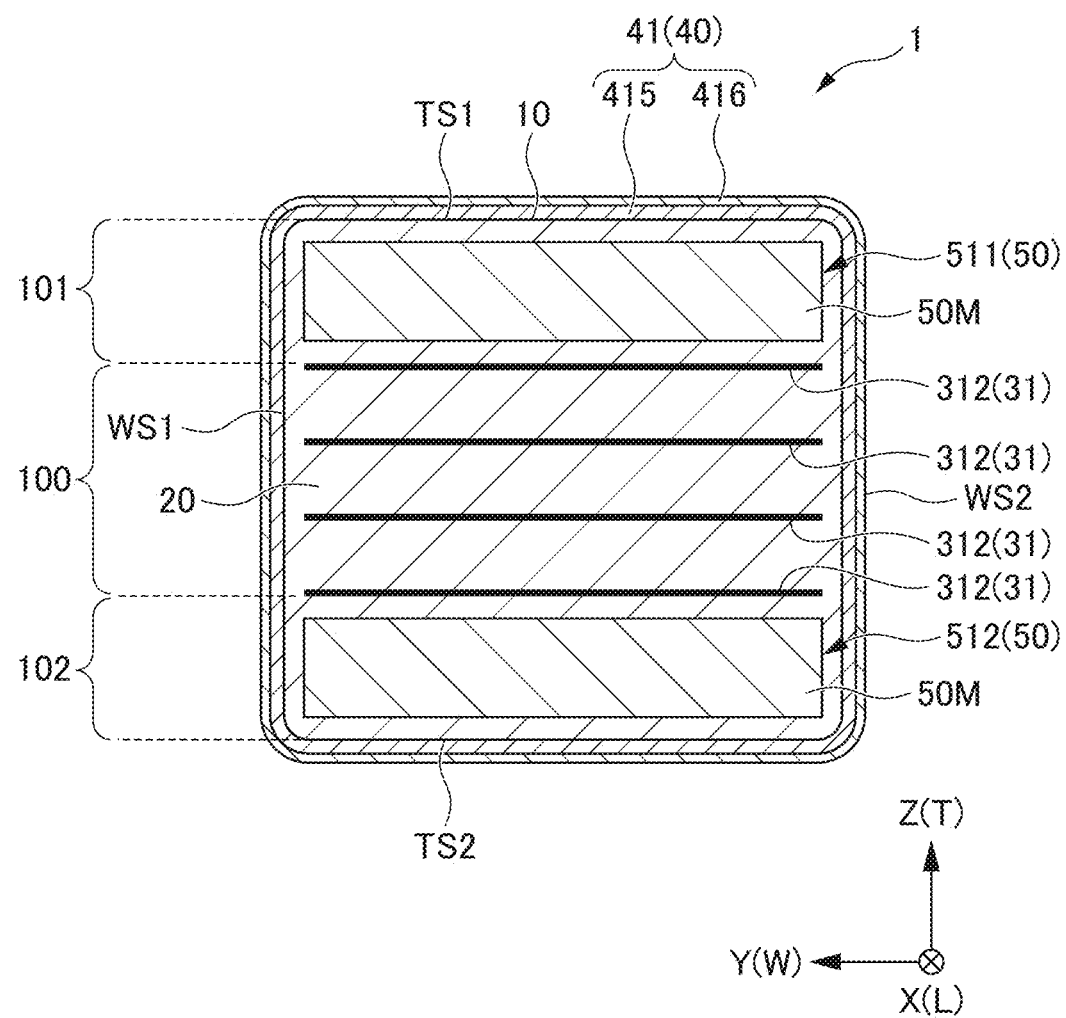
FIG. 7 is a cross-sectional view taken along VII-VII line of the multilayer ceramic capacitor shown in FIG. 6.

While preferred embodiments of the present invention have been described above, the present invention is not to be limited to the above-described preferred embodiments, and various changes and modifications can be made. For example, in the preferred embodiments described above, the metal diffusion base portion 50 including the plurality of metal films 50M stacked in the stacking direction T is exemplified. However, the present invention is not limited to this and, for example, as shown in FIGS. 6 and 7, the metal diffusion base portion 50 may include a metal film 50M extending in the stacking direction T at the end surfaces LS1 and LS2. The shape of the metal film 50M is not particularly limited and may be, for example, a rectangular or substantially rectangular shape as shown in FIG. 7.

Furthermore, the preferred embodiments described above illustrates the multilayer ceramic capacitor 1 in which the external electrode layers 40 are respectively provided on the end surfaces LS1 and LS2 of the multilayer body 10. However, the present invention is not limited to this, and the present invention can be applied to, for example, a multilayer ceramic capacitor in which external electrodes are further provided on the side surfaces WS1 and WS2 of the multilayer body 10. Furthermore, the features of the preferred embodiment described above may also be applied to the external electrodes provided on the side surfaces WS1 and WS2 of the multilayer body 10. That is, the multilayer ceramic capacitor may further include a metal diffusion base portion that enables metal to be diffused in the external electrode layers provided on the side surfaces WS1 and WS2 of the multilayer body 10, and the external electrode layers provided on the side surface WS1 and WS2 of the multilayer body 10 may each include a high-content region having a relatively high metal content.

Furthermore, in the preferred embodiments described above, the multilayer ceramic capacitor including a dielectric ceramic is exemplified as a multilayer ceramic electronic component. However, the features of the external electrode layer of the present invention are not limited thereto, and they are also applicable to various multilayer ceramic electronic components, such as, for example, a piezoelectric component using a piezoelectric ceramic, a thermistor using a semiconductor ceramic, and an inductor using a magnetic ceramic. Examples of the piezoelectric ceramic include PZT-based ceramics, examples of the semiconductor ceramics include spinel-based ceramics, and examples of the magnetic ceramic include ferrite and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
    a multilayer body including a plurality of ceramic layers and an inner conductive layer that are stacked, a first main surface and a second main surface on opposite sides in a stacking direction, a first side surface and a second side surface on opposite sides in a width direction intersecting with the stacking direction, and a first end surface and a second end surface on opposite sides in a length direction intersecting with the stacking direction and the width direction;
    a first external electrode layer on the first end surface of the multilayer body and connected to the inner conductive layer; and
    a second external electrode layer provided on the second end surface of the multilayer body and connected to the inner conductive layer; wherein
    the first external electrode layer includes a first foundation electrode layer defined by a fired layer including metal and glass, and a plated layer covering the first foundation electrode layer;
    the second external electrode layer includes a second foundation electrode layer defined by a fired layer including metal and glass, and a plated layer covering the second foundation electrode layer;
    the multilayer body includes an inner layer portion including a portion of the plurality of ceramic layers and the inner conductive layer, and two outer layer portions sandwiching the inner layer portion and each including another portion of the plurality of ceramic layers other than the portion of the plurality of ceramic layers;
    the first foundation electrode layer includes a first inner layer electrode portion adjacent to the inner layer portion of the multilayer body, and two first outer layer electrode portions respectively adjacent to the two outer layer portions of the multilayer body;

the second foundation electrode layer includes a second inner layer electrode portion adjacent to the inner layer portion of the multilayer body, and two second outer layer electrode portions respectively adjacent the two outer layer portions of the multilayer body;

a maximum thickness of each of the first inner layer electrode portion, the two first outer layer electrode portions, the second inner layer electrode portion, and the two second outer layer electrode portions in the length direction is about 1 µm or more and about 40 µm or less;

each of the two first outer layer electrode portions is thinner than the first inner layer electrode portion;

each of the two second outer layer electrode portions is thinner than the second inner layer electrode portion;

each of the two first outer layer electrode portions includes a first outer layer high-content region and a first outer layer low-content region in order from the first end surface of the multilayer body;

each of the two second outer layer electrode portions includes a second outer layer high-content region and a second outer layer low-content region in order from the second end surface of the multilayer body;

a content of metal in the first outer layer high-content region is higher than a content of metal in the first outer layer low-content region;

a content of metal in the second outer layer high-content region is higher than a content of metal in the second outer layer low-content region;

a glass content in the first outer layer high-content region is lower than a glass content in the first outer layer low-content region; and a glass content in the second outer layer high-content region is lower than a glass content in the second outer layer low-content region.

2. The multilayer ceramic electronic component according to claim 1, wherein a first metal diffusion base portion is provided in at least a portion adjacent to the first outer layer electrode portion in each of the two outer layer portions, and a portion of metal of the first metal diffusion base portion is diffused to the first outer layer high-content region; and a second metal diffusion base portion is provided in at least a portion adjacent to the second outer layer electrode portion in each of the two outer layer portions, and a portion of metal of the second metal diffusion base portion is diffused to the second outer layer high-content region.

3. The multilayer ceramic electronic component according to claim 2, wherein each of the first metal diffusion base portion and the second metal diffusion base portion includes a plurality of metal films stacked in the stacking direction with an interval of about 0.2 µm or more and about 1 µm or less.

4. The multilayer ceramic electronic component according to claim 2, wherein the first outer layer high-content region includes a metal component which is the same as a metal component of the first metal diffusion base portion, such that a content of metal in the first outer layer high-content region is higher than content of metal in the first outer layer low-content region; and the second outer layer high-content region includes a metal component which is the same as a metal component of the second metal diffusion base portion, such that content of metal in the second outer layer high-content region is higher than content of metal in the second outer layer low-content region.

5. The multilayer ceramic electronic component according to claim 4, wherein metal included in each of the first foundation electrode layer and the second foundation electrode layer includes Cu as a main component;

metal diffused from each of the first metal diffusion base portion and the second metal diffusion base portion includes Ni as a main component;

a content of Ni in the first outer layer high-content region is higher than a content of Ni in the first outer layer low-content region; and a content of Ni in the second outer layer high-content region is higher than a content of Ni content of the second outer layer low-content region.

6. The multilayer ceramic electronic component according to claim 1, wherein the first inner layer electrode portion includes a first inner layer high-content region and a first inner layer low-content region in order from the first end surface of the multilayer body;

the second inner layer electrode portion includes a second inner layer high-content region and a second inner layer low-content region in order from the second end surface of the multilayer body;

a content of metal in the first inner layer high-content region is higher than a content of metal in the first inner layer low-content region;

a content of metal in the second inner layer high-content region is higher than a content of metal in the second inner layer low-content region;

the first outer layer high-content region and the first inner layer high-content region are connected with each other; and the second outer layer high-content region and the second inner layer high-content region are connected with each other.

7. The multilayer ceramic electronic component according to claim 1, wherein the first outer layer high-content region is provided from a portion in contact with a boundary between the inner layer portion and an outer layer portion on a side of the first main surface of the two outer layer portions, to a portion in contact with the first main surface in the stacking direction; and the second outer layer high-content region is provided from a portion in contact with a boundary between the inner layer portion and an outer layer portion on a side of the second main surface of the two outer layer portions, to a portion in contact with the second main surface in the stacking direction.

8. The multilayer ceramic electronic component according to claim 3, wherein the first foundation electrode layer includes a first extension electrode portion extending from the first end surface of the multilayer body to a portion of the first main surface and a portion of the second main surface of the multilayer body;

the second foundation electrode layer includes a second extension electrode portion extending from the second end surface of the multilayer body to a portion of the first main surface and a portion of the second main surface of the multilayer body; and where a length of the plurality of metal films, a length of the first extension electrode portion, and a length of the second extension electrode portion are each defined as a length in the length direction, the length of the plurality of metal films in the first metal diffusion base portion is shorter than the length of the first extension electrode portion, and the length of the plurality of metal films in the second metal diffusion base portion is shorter than the length of the second extension electrode portion.

9. The multilayer ceramic electronic component according to claim 3, wherein
the inner conductive layer includes a first inner conductive layer connected to the first foundation electrode layer at the first end surface of the multilayer body, and a second inner conductive layer connected to the second foundation electrode layer at the second end surface of the multilayer body;
the plurality of metal films in the first metal diffusion base portion are connected to the first foundation electrode layer at the first end surface and do not overlap with the second inner conductive layer in the stacking direction; and
the plurality of metal films in the second metal diffusion base portion are connected to the second foundation electrode layer at the second end surface and do not overlap with the first inner conductive layer in the stacking direction.

10. The multilayer ceramic electronic component according to claim 3, wherein a thickness of the plurality of metal films is equal to or less than a thickness of the inner conductive layer.

11. The multilayer ceramic electronic component according to claim 1, wherein
the plurality of ceramic layers include a dielectric layer;
the inner conductive layer include a first internal electrode layer connected to the first external electrode layer, and a second internal electrode layer connected to the second external electrode layer; and
the first internal electrode layer and the second internal electrode layer are opposed to each other via a portion of the dielectric layer.

12. The multilayer ceramic electronic component according to claim 1, wherein the plurality of ceramic layers include at least one as a main component of $BaTiO_3$, $CaTiO_3$, $SrTiO_3$, or $CaZrO_3$ as a main component.

13. The multilayer ceramic electronic component according to claim 12, wherein the plurality of ceramic layers further include at least one of a Mn compound, a Fe compound, a Cr compound, a Co compound, or a Ni compound as a sub-component.

14. The multilayer ceramic electronic component according to claim 1, wherein each of the plurality of ceramic layers has a thickness of about 0.2 μm and about 1.0 μm or less.

15. The multilayer ceramic electronic component according to claim 1, wherein each of the plurality of ceramic layers has a thickness of about 0.3 μm or more and about 0.5 μm or less.

16. The multilayer ceramic electronic component according to claim 1, wherein the inner conductive layer has a thickness of about 0.2 μm or more and about 2.0 μm or less.

17. The multilayer ceramic electronic component according to claim 2, wherein each of the first metal diffusion base portion and the second metal diffusion base portion includes a plurality of metal films stacked in the stacking direction with an interval of about 0.3 μm or more and about 0.5 μm or less.

18. A multilayer ceramic electronic component comprising:
a multilayer body including a plurality of ceramic layers and an inner conductive layer that are stacked, a first main surface and a second main surface on opposite sides in a stacking direction, a first side surface and a second side surface on opposite sides in a width direction intersecting with the stacking direction, and a first end surface and a second end surface on opposite sides in a length direction intersecting with the stacking direction and the width direction;
a first external electrode layer on the first end surface of the multilayer body and connected to the inner conductive layer; and
a second external electrode layer provided on the second end surface of the multilayer body and connected to the inner conductive layer; wherein
the first external electrode layer includes a first foundation electrode layer defined by a fired layer including metal and glass, and a plated layer covering the first foundation electrode layer;
the second external electrode layer includes a second foundation electrode layer defined by a fired layer including metal and glass, and a plated layer covering the second foundation electrode layer;
the multilayer body includes an inner layer portion including a portion of the plurality of ceramic layers and the inner conductive layer, and two outer layer portions sandwiching the inner layer portion and each including another portion of the plurality of ceramic layers other than the portion of the plurality of ceramic layers;
the first foundation electrode layer includes a first inner layer electrode portion adjacent to the inner layer portion of the multilayer body, and two first outer layer electrode portions respectively adjacent to the two outer layer portions of the multilayer body;
the second foundation electrode layer includes a second inner layer electrode portion adjacent to the inner layer portion of the multilayer body, and two second outer layer electrode portions respectively adjacent the two outer layer portions of the multilayer body;
a maximum thickness of each of the first inner layer electrode portion, the two first outer layer electrode portions, the second inner layer electrode portion, and the two second outer layer electrode portions in the length direction is about 1 μm or more and about 40 μm or less;
each of the two first outer layer electrode portions is thinner than the first inner layer electrode portion;
each of the two second outer layer electrode portions is thinner than the second inner layer electrode portion;
each of the two first outer layer electrode portions includes a first outer layer high-content region and a first outer layer low-content region in order from the first end surface of the multilayer body;
each of the two second outer layer electrode portions includes a second outer layer high-content region and a second outer layer low-content region in order from the second end surface of the multilayer body;
a content of metal in the first outer layer high-content region is higher than a content of metal in the first outer layer low-content region;

a content of metal in the second outer layer high-content region is higher than a content of metal in the second outer layer low-content region;

the first outer layer high-content region is provided from a portion in contact with a boundary between the inner layer portion and an outer layer portion on a side of the first main surface of the two outer layer portions, to a portion in contact with the first main surface in the stacking direction; and the second outer layer high-content region is provided from a portion in contact with a boundary between the inner layer portion and an outer layer portion on a side of the second main surface of the two outer layer portions, to a portion in contact with the second main surface in the stacking direction.

19. A multilayer ceramic electronic component comprising:

a multilayer body including a plurality of ceramic layers and an inner conductive layer that are stacked, a first main surface and a second main surface on opposite sides in a stacking direction, a first side surface and a second side surface on opposite sides in a width direction intersecting with the stacking direction, and a first end surface and a second end surface on opposite sides in a length direction intersecting with the stacking direction and the width direction;

a first external electrode layer on the first end surface of the multilayer body and connected to the inner conductive layer; and a second external electrode layer provided on the second end surface of the multilayer body and connected to the inner conductive layer; wherein the first external electrode layer includes a first foundation electrode layer defined by a fired layer including metal and glass, and a plated layer covering the first foundation electrode layer;

the second external electrode layer includes a second foundation electrode layer defined by a fired layer including metal and glass, and a plated layer covering the second foundation electrode layer;

the multilayer body includes an inner layer portion including a portion of the plurality of ceramic layers and the inner conductive layer, and two outer layer portions sandwiching the inner layer portion and each including another portion of the plurality of ceramic layers other than the portion of the plurality of ceramic layers;

the first foundation electrode layer includes a first inner layer electrode portion adjacent to the inner layer portion of the multilayer body, and two first outer layer electrode portions respectively adjacent to the two outer layer portions of the multilayer body;

the second foundation electrode layer includes a second inner layer electrode portion adjacent to the inner layer portion of the multilayer body, and two second outer layer electrode portions respectively adjacent the two outer layer portions of the multilayer body;

a maximum thickness of each of the first inner layer electrode portion, the two first outer layer electrode portions, the second inner layer electrode portion, and the two second outer layer electrode portions in the length direction is about 1 µm or more and about 40 µm or less;

each of the two first outer layer electrode portions is thinner than the first inner layer electrode portion;

each of the two second outer layer electrode portions is thinner than the second inner layer electrode portion;

each of the two first outer layer electrode portions includes a first outer layer high-content region and a first outer layer low-content region in order from the first end surface of the multilayer body;

each of the two second outer layer electrode portions includes a second outer layer high-content region and a second outer layer low-content region in order from the second end surface of the multilayer body;

a content of metal in the first outer layer high-content region is higher than a content of metal in the first outer layer low-content region;

a content of metal in the second outer layer high-content region is higher than a content of metal in the second outer layer low-content region;

a first metal diffusion base portion is provided in at least a portion adjacent to the first outer layer electrode portion in each of the two outer layer portions, and a portion of metal of the first metal diffusion base portion is diffused to the first outer layer high-content region;

a second metal diffusion base portion is provided in at least a portion adjacent to the second outer layer electrode portion in each of the two outer layer portions, and a portion of metal of the second metal diffusion base portion is diffused to the second outer layer high-content region;

each of the first metal diffusion base portion and the second metal diffusion base portion includes a plurality of metal films stacked in the stacking direction with an interval of about 0.2 µm or more and about 1 µm or less;

the inner conductive layer includes a first inner conductive layer connected to the first foundation electrode layer at the first end surface of the multilayer body, and a second inner conductive layer connected to the second foundation electrode layer at the second end surface of the multilayer body;

the plurality of metal films in the first metal diffusion base portion are connected to the first foundation electrode layer at the first end surface and do not overlap with the second inner conductive layer in the stacking direction; and the plurality of metal films in the second metal diffusion base portion are connected to the second foundation electrode layer at the second end surface and do not overlap with the first inner conductive layer in the stacking direction.

* * * * *